MESA MULTI-CHANNEL FIELD-EFFECT TRIODE

INVENTORS.
VERDA O. HINKLE JR.,
RAINER ZULEEG,
BY
W. H. MacAllister Jr.
ATTORNEY.

April 30, 1968 V. O. HINKLE, JR., ET AL 3,381,189

MESA MULTI-CHANNEL FIELD-EFFECT TRIODE

Filed Aug. 18, 1964 2 Sheets-Sheet 2

INVENTORS.
VERDA O. HINKLE JR.,
RAINER ZULEEG,
BY
ATTORNEY

United States Patent Office 3,381,189
Patented Apr. 30, 1968

3,381,189
MESA MULTI-CHANNEL FIELD-EFFECT TRIODE
Verda O. Hinkle, Jr., Huntington Beach, and Rainer Zuleeg, Newport Beach, Calif., assignors to Hughes Aircraft Company, Culver City, Calif., a corporation of Delaware
Filed Aug. 18, 1964, Ser. No. 390,291
8 Claims. (Cl. 317—235)

This invention relates to novel high frequency solid-state electronic devices and to methods for fabricating such devices. More particularly, the invention relates to field-effect solid-state active devices such as rectifiers and amplifiers. As used herein the term "active device" means any solid-state electronic device which can alter one or more characteristics of an electrical signal applied thereto in a controllable and reproducible fashion in contrast to a "passive device" which does not controllably alter the characteristics of an electrical signal applied thereto or transmitted thereby.

Active field-effect semiconductor devices, sometimes called "unipolar" or "analog" transistors, are known. A thin-film form of such a transistor is described in our co-pending application S.N. 634,395, which is a continuation of S.N. 258,081, now abandoned, filed Feb. 12, 1963, and assigned to the instant assignee. Unipolar or analog transistors have also been described by W. Shockley in an article entitled, "Transistor Electronics: Imperfections, Unipolar and Analog Transistors," published in the November 1952 Proceedings of the I.R.E. (vol. 40, No. 11) at page 1289 and especially at page 1311. Because of both the techniques for forming such devices and because of their extremely small dimensions, the fabrication of complete solid-state circuits including passive as well as active functions, has become of increasing importance and has given rise to a whole new art called variously, solid circuitry, micro-circuitry, integrated circuitry, or micro-electronics. Such circuitry is possible because of the ability to form thin films by vapor-deposition, masking, and solid-state diffusion techniques which films are capable of controllably providing such functions as rectification, amplification, resistance, capacitance, and inductance, in a single integrated structure. Thus, amplification can be provided by vapor-depositing a metallic electrode, which may be called a "source," upon a substrate and then depositing a layer of a semi-insulator material upon the "source" electrode. A "drain" or collector electrode is then formed by depositing a thin metallic film on the semi insulator body. Likewise by masking and vapor-deposition techniques an additional metallic "gate" or control electrode in the form of a grid, for example, may be disposed in the semi-insulator body between the source and drain electrode films. Thus the flow of majority charge carriers from the source to the drain electrode through the semi-insulator body may be controlled by the field therein established by a signal on the gate electrode. Such devices are closely analogous to vacuum tube devices (hence the term "analog" transistors) except that in these field-effect devices the charge carriers flow from cathode (source) to anode (drain) in a solid medium generally called a semi-insulator. In order to provide a convenient distinction between semiconductor transistors utilizing rectifying junctions or point contacts to achieve rectification or amplification, the unipolar transistor devices to which the present invention relates is referred to herein as a field-effect triode device. In comparison with semiconductor devices of the junction type in which charge carriers already available in the semiconductor body as injected across a junction between regions of opposite conductivity, the charge carriers in the field-effect triode device of the present invention are normally not available in the body of semi-insulator and are injected thereinto by and from the aforementioned source electrode.

In the co-pending application of R. Zuleeg, S.N. 633,638 which is a continuation of S.N. 333,127, now abandoned, filed Dec. 24, 1963, and assigned to the instant assignee, such a field-effect triode device is described which comprises a grid of N-type material, for example, embedded in a body of P-type silicon which grid serves as the "gate" electrode between the "source" and "drain" electrodes which in one embodiment are constituted by metallic films disposed on opposite surfaces of the silicon body. In this device the current flowing from the source electrode to the drain electrode through the body of semi-insulator material is controlled by impressing an appropriate signal on the N-type grid gate. This signal establishes an electric field around the grid so as to effectively suppress or close-off the flow of majority charge carriers through the interstices of the grid from the source to the drain electrodes.

It will be appreciated that maximum usefulness and effectiveness of such a device is achieved only by confining the current flowing from the source to the drain to the channel or channels of the grid which are controlled by the electric field established thereon by the grid signal. In integrated circuitry, where such a device may be disposed on a fairly extensive semi-insulator body, such confinement may be a difficult achievement since the source-drain current may continue to flow around the grid and not through it.

It is, therefore, an object of the present invention to provide an improved field-effect solid-state electrical device.

Another object of the invention is to provide an improved field-effect triode device.

Another object of the invention is to provide an improved field-effect triode device having a grid gate electrode and means for confining current flow through the gate electrode.

Yet another object of the invention is to provide an improved field-effect triode device for use in microelectronic integrated circuitry which can be fabricated as an integral part of such circuitry, and which device has means for isolating its current flow between its input and output electrodes.

These and other objects and advantages of the invention are attained by providing a body of semi-insulator material having a mesa portion in which the grid gate electrode is disposed in a field-effect triode device. In a typical embodiment, a body of N-type semi-insulator material having a mesa portion is disposed between a pair of electrically conductive members constituting the source and drain electrodes of the device so that the drain electrode is disposed on the mesa portion. A P-type grid of semi-insulator material is embedded in the mesa portion of the semi-insulator body between the source and drain electrodes. Current flowing in the triode device between the source-drain areas thereof must flow through the mesa portions and hence through the grid gate thus providing more effective control or "pinch-off" thereof by the grid gate as well as higher transconductance.

The invention will be described in greater detail by reference to the drawings in which.

In connection with a field-effect triode device according to the present invention, the term "semi-insulator" refers to and means any material which at room temperature has a low intrinsic majority carrier concentration so that at room temperature the material exhibits low electrical conductivity. In general, any material which exhibits an energy gap of at least about 1.0 ev. is satisfactory for the semi-insulator element in the devices of the present invention. Suitable materials are silicon and compounds of the elements from the Third with elements from the Fifth Columns of the Periodic Table of the Elements such as: aluminum phosphide, aluminum arsenide, aluminum antimonide, gallium phosphide, gallium arsenide, indium phosphide, also satisfactory are compounds of the elements from the Second Column with elements from the Sixth Column of the Periodic Table of the Elements such as: zinc sulfide, zinc selenide, zinc telluride, cadmium sulfide, and cadmium selenide, cadmium telluride, and mercury sulfide. Silicon carbide is also a suitable semi-insulator material for the purposes of the present invention. While any of the aforementioned materials may be used to advantage in the practice of the invention, description herein will be confined primarily to the use of silicon as an exemplary material.

Figure 1:
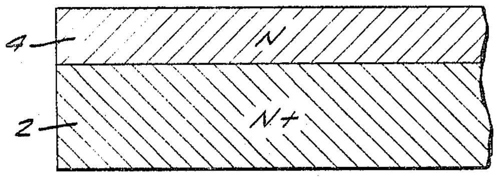
FIGURE 1 is a cross-sectional elevational view of a field-effect triode device according to the invention in an initial stage of fabrication thereof.

As shown in FIGURE 1, a substrate member 2 of high conductivity N-type silicon, for example, is provided for supporting the field-effect triode device to be fabricated. Although such a device may comprise a body of semi-insulator material sandwiched between metallic layers which may serve as source and drain electrodes, it is not essential that these electrodes be metallic. As taught in the aforementioned co-pending application of R. Zuleeg (S.N. 333,127 filed Dec. 24, 1963), the source and/or drain electrodes may be formed of highly conductive semi-insulator material.

Because of the great difficulty in vapor-depositing silicon upon substrate surfaces of materials other than silicon itself, the fabrication of a field-effect triode device utilizing silicon as the semi-insulator material is facilitated by the employment of a substrate of silicon which, according to the embodiment shown may also conveniently serve as the source electrode. Thus, silicon may be conveniently deposited upon silicon, making it feasible to form at least the lower or source electrode and substrate of silicon which has been heavily-doped so as to be an effective electrical conductor. It is known that by heavy doping of a semi-insulator body, such body can be converted to degenerative semi-insulator material which means that the body has such a concentration of impurity therein as to cause it to lose its semi-insulator characteristics and to behave as a more conventional electrical conductor. The silicon semi-insulator material constituting the device body proper may then be deposited upon this degeneratively-doped silicon.

To achieve the arrangement shown in FIGURE 1 several methods of fabrication are available. A body of semi-insulator material having the resistivity desired for the field-effect device may be initially provided. By diffusion one portion of the body may be doped to degeneracy to thus form a source electrode member and substrate 2 while leaving the opposite surface portion unchanged in resistivity so as to constitute a first device body portion 4, as shown. Alternatively, a substrate and source electrode member 2 of high conductivity semi-insulator material may be initially provided and, as will be described in greater detail hereinafter, by an epitaxial process the first device body portion 4 may be formed on the substrate-electrode 2.

For convenience and solely for purposes of illustration the device semi-insulator body in this embodiment of the invention may be referred to as being of N-type conductivity due to an excess of majority charge carriers (i.e., electrons) therein. The grid gate electrode member 6 may be referred to as being of P-type conductivity due to a deficiency of majority charge carriers (i.e., electrons) therein. It will be understood that such conductivity conditions are usually established by the incorporation of certain impurity elements into the bulk and semi-insulator material. Thus silicon, for example, may have any one of such impurity elements as arsenic, antimony, or phosphorous incorporated therein to establish N-type conductivity since these elements contribute an excess of electrons to the silicon for current conduction. P-type silicon may have any one of such impurity elements as aluminum, boron or indium incorporated therein to establish P-type conductivity since these elements lack an excess of electrons for current conduction. The process of incorporating such impurity elements into the crystal lattice structure of semiconductor materials is well known and is commonly referred to as "doping" and may be achieved by diffusing or alloying the impurity into the semiconductor body or by including such impurity in the melt from which the semiconductor crystal body is grown.

According to the invention, the gate electrode member 6 may be of semi-insulator material and, as has been mentioned previously, of the same material as the semi-insulator body 4 although of different conductivity type. Thus, if as described the semi-insulator body 4 is of N-type conductivity, the gate electrode member 6 may be of P-type conductivity.

Figure 2:
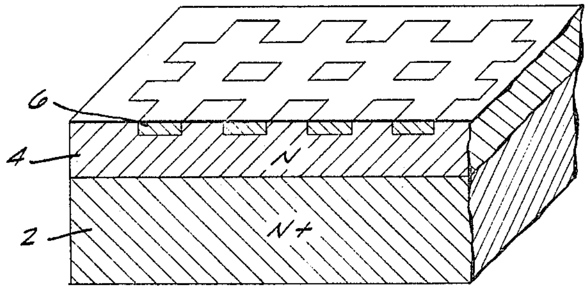
FIGURE 2 is a perspective view partly in section of the field-effect triode device shown in FIGURE 1 at a subsequent stage in the fabrication thereof.
Figure 3:
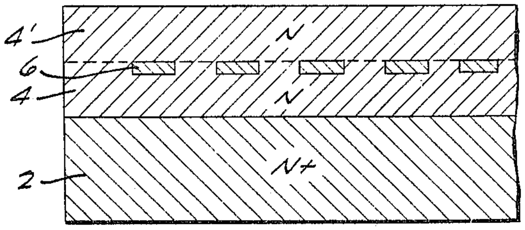
FIGURE 3 is a cross-sectional elevational view of the field-effect triode device shown in FIGURE 2 at a further subsequent stage in the fabrication thereof.
Figure 4:
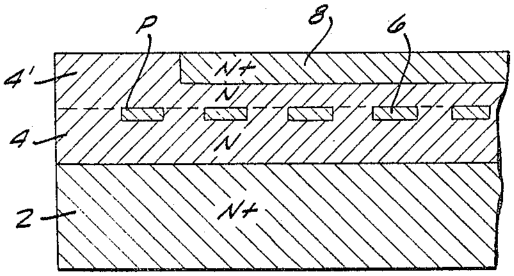
FIGURE 4 is a cross-sectional elevational view of the field-effect triode device shown in FIGURE 3 at a still further subsequent stage in the fabrication thereof.

Referring to the drawings, the fabrication of a field-effect triode device according to the invention having a grid gate electrode 6 may be achieved by diffusing an acceptor conductivity-type-determining impurity through a suitable mask upon the surface of the N-type layer 4. The mask may be formed by oxidizing the surface of the silicon layer 4 and then removing portions of the oxide corresponding to the dimensions and pattern of the grid to be formed. The formation of such an oxide mask may be achieved by photo-resist and etching techniques as is well known in the art. Diffusion of the acceptor impurity is then achieved so as to form a grid 6 of P-type silicon material in the N-type silicon layer 4. Thereafter the oxide mask is entirely removed leaving the structure shown in FIGURES 2 and 3. These oxide masking diffusion techniques are well known in the art and reference is made to U.S. Patents Nos. 2,802,760 to Derick and Frosch and 3,025,589 to Hoerni for a complete, detailed description thereof.

A layer 4' of N-type silicon may then be epitaxially deposited upon the P-type grid 6 and the exposed portions of the N-type layer 4. In this process the silicon may be formed by the epitaxial process and caused to deposit upon the N-type layer 4 by the simultaneous reduction in hydrogen of phosphorous trichloride and silicon tetrachloride at a temperature of from 1200–1300° C. The epitaxial process is well known and fully described by H. C. Theuerer in the Journal of the Electrochemical Society (1961, vol. 108 at page 649) and by A. Mark in the same Journal (1961, vol. 108 at page 880).

Figure 5:
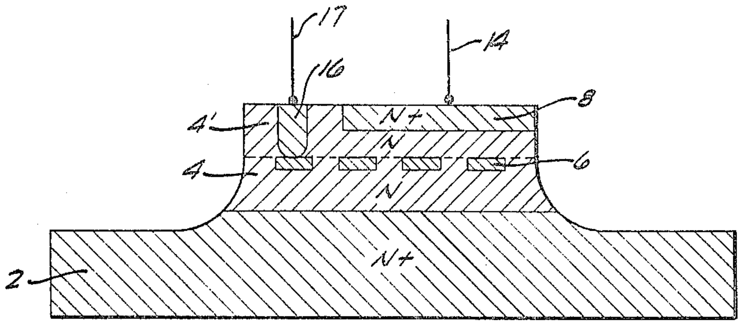
FIGURE 5 is a cross-sectional elevational view of a mesa field-effect triode device according to the invention.

The upper surface of the N-type layer 4' may then be masked as by oxidizing this surface and then the drain electrode layer or member 8 may be formed by removing a portion of the oxide mask and diffusing into the exposed portion of the N-type layer 4' a donor impurity such as arsenic thus forming the layer 8 of high conductivity material therein. Thereafter, by the photo-resist and etching procedures described previously, the drain electrode 8 may be covered with an etch-resistant coating and all of the silicon material surrounding the drain and gate electrodes may be removed as by etching the silicon away down to the high conductivity N-type substrate portion 2 as shown in FIGURE 5. In this manner the semi-insulator body 4, 4' is in the form of a mesa or plateau so that the grid gate electrode 6 is disposed in the mesa portion with the drain electrode 8 being disposed on the top of the mesa.

Connections to the grid gate electrode 6 and to the drain electrode 8 may be made in one of several manners. As shown in the drawings a wire 14 may be directly secured to the drain electrode portion 8 by the thermo-compression bonding techniques or by soldering or even pulse-bonding as is well known in the semiconductor art. Connection to the grid gate electrode 6 may be provided by diffusing a P-type impurity such as boron, for example, into an area of the semi-insulator body portion 4' which is exposed on the upper surface of the mesa. It will be understood that such a diffusion is made deep enough so as to provide a P-type region 16 which extends down into contact with at least a portion of the grid electrode 6. Alternatively, the P-type region 16 may be provided by alloying an acceptor conductivity-type-determining impurity to the semi-insulator body 4' at an exposed top surface thereof. Thereafter, a wire 17 may be connected to this P-type region 16 as by pulse-bonding, soldering, or thermo-compression bonding techniques.

Figure 6:
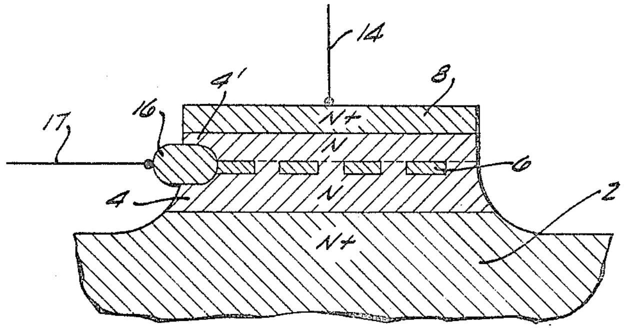
FIGURE 6 is a cross-sectional elevational view of the mesa portion of the field-effect triode device shown in FIGURE 5 illustrating an alternate embodiment thereof.
Figure 7:
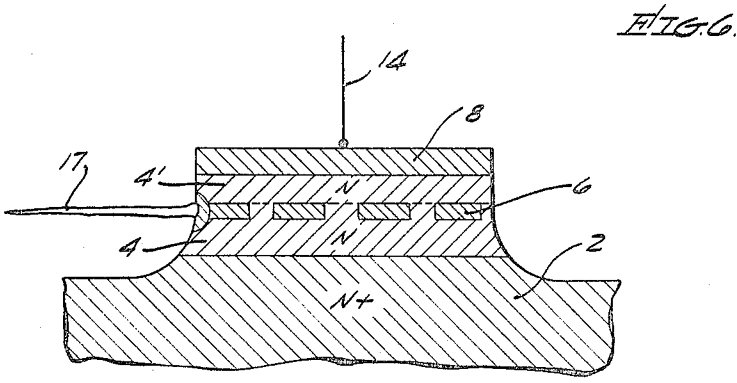
FIGURE 7 is a cross-sectional elevational view of the mesa portion of the field-effect triode device shown in FIGURE 5, illustrating another embodiment thereof.

In FIGURES 6 and 7 alternatives methods are shown for providing connections to the grid electrode member 6 from other than the top surface of the mesa. In FIGURE 6 an acceptor conductivity-type-determining impurity may be alloyed from the side of the mesa so as to form a P-type region 16 which extends laterally into the mesa to contact the grid electrode 6. Thereafter, a wire may be secured to the P-type alloy region 16 by suitable techniques as suggested hereinbefore. In FIGURE 7 an acceptor-doped or coated wire 17 may be pulse-bonded to the side of the mesa and into the semi-insulator material body 4' so as to contact the grid electrode 6. This latter alternative has the advantage of providing the necessary connection in one step and is well known in the art. A more complete description of a suitable pulse-bonding technique is described in U.S. Patent 2,792,538 to W. G. Pfann.

The complete device shown in FIGURE 5 includes a drain electrode member 8 comprising a layer of high conductivity N-type silicon disposed on at least a portion of the top of the mesa, a source electrode member 2 comprising also a layer of high conductivity N-type silicon disposed below the mesa, and a semi-insulator body 4, 4' of lower conductivity N-type silicon which is in the form of a mesa disposed on source electrode-substrate member 2 with a P-type grid gate electrode member 6 being disposed in the semi-insulator mesa portion. In this device the current flowing from the electrode layer 2 to the electrode layer 8 through the N-type silicon material 4 and 4' may be controlled by impressing any desired signal on the P-type grid 6. An appropriate voltage signal on the grid 6 will establish a space-charge region around the N-type openings or channel portions of the grid the width of which space-charge region or regions is variable and controllable in accordance with the grid signal. Hence, the channels for the flow of majority charge carrier current through the grid are of variable and controllable cross-sectional area thus permitting one to effectively regulate and suppress or "pinch-off" the flow of such current as desired. Because of the mesa configuration the source-drain current must necessarily flow through the grid gate electode 6, thus subjecting substantially all of this source-drain flow to effective control by grid gate member 6.

The device of FIGURE 5 may also be provided in the reverse polarity, that is, the grid 6 may be composed of N-type material and the semi-insulator body 4, 4' of P-type material in which case the source and drain electrodes 2 and 8 would be composed of high conductivity P-type material. The device may also be covered by an insulator such as by oxidizing exposed areas of the semi-insulator body for protection, if desired.

While the drain electrode 8 has been described as being formed by diffusion, this is not the only way in which this electrode may be fabricated. Alternatively, it is possible to deposit a predetermined quantity of gold and antimony (say 1% antimony) on the surface of the semi-insulator body and to heat the assembly for a short time (say one or two minutes) at a temperature of from 300–500° C. so as to alloy the gold-antimony to the silicon material thus forming the high conductivity drain electrode 8. In some instances this alloying technique may be preferred over diffusion because of the relatively short time required to form the alloy region in contrast to diffusion processes which often are long enough and of high enough temperatures to cause other regions of the device to undergo undesired further diffusion.

While a grid of rectilinear geometry has been shown, it is not necessary that the grid shape be so restricted. In some instances a grid formed so as to provide round or circular channels may be preferred since such round channeled grids are capable of pinching-off the current flow with only half of the voltage required for grids having a square-channel configuration. The significance of the geometry or shape of the channels in the grid will be appreciated when it is understood that the pinch-off voltage is determined by the following expression for round channels:

$$V_{PO}=\frac{D^2}{16\epsilon\ \epsilon_0\mu\rho}$$

where D is the diameter of the channel, $\epsilon$ is the relative dielectric constant of the semi-insulator material in the channel, $\mu$ is the mobility of the charge carriers in the channel, $\rho$ is the resistivity of the semi-insulator material in the channel, and $\epsilon_0$ is the permittivity of vacuum.

In contrast, the pinch-off voltage ($V_{PO}$) for a square channel device is determined according to the following expression:

$$V_{PO}=\frac{D^2}{8\epsilon\ \epsilon\mu\rho}$$

What is claimed is:

1. A field-effect triode device comprising:
(a) a body of semi-insulator material having a mesa portion of a first conductivity type;
(b) a grid control electrode member disposed in and surrounded by said mesa portion of said body;
(c) electrically conductive electrode members disposed on opposite surfaces of said mesa portion of said body;
(d) and a region of semi-insulator material of a conductivity type opposite to said first type disposed on a surface of mesa portion of said body and extending thereinto so as to electrically contact said control electrode member.

2. A field-effect triode device comprising:
(a) a body of semi-insulator material having a mesa portion of a first conductivity type;
(b) a control electrode member in the form of a grid of semi-insulator material of a second type of conductivity different from said first type disposed in and surrounded by said mesa portion of said body;
(c) electrically conductive electrode members disposed on opposite surfaces of said mesa portion of said body;
(d) and a region of semi-insulator material of said second type of conductivity disposed on a surface of said mesa portion of said body and extending thereinto so as to electrically contact said control electrode member.

3. A field-effect triode device comprising:
(a) a body of semi-insulator material having a mesa portion of a first conductivity-type;

(b) a control electrode member in the form of a grid of semi-insulator material of a second type of conductivity different from said first type disposed in and surrounded by said mesa portion of said body;

(c) input and output electrode members comprising degeneratively-doped, electrically conductive, opposed surface portions of said mesa portion of said body;

(d) and a region of semi-insulator material of said second type of conductivity disposed on a surface of said mesa portion of said body and extending thereinto so as to electrically contact said control electrode member.

4. A field-effect triode device comprising:

(a) a body of semi-insulator material having a mesa portion of a first conductivity-type;

(b) a control electrode in the form of a grid of semi-insulator material of opposite conductivity-type to said first type disposed in and surrounded by said mesa portion of said body;

(c) an electrically conductive drain electrode member disposed on the exposed surface of said mesa portion of said body;

(d) an electrically conductive source electrode member disposed on the opposite surface of said mesa portion of said body;

(e) and a region of semi-insulator material of said opposite conductivity-type disposed on the surface of said mesa portion of said body on which said drain electrode is disposed, said region extending into said mesa portion of said body so as to electrically contact said control electrode member.

5. The invention according to claim 4 wherein said source and drain electrode members are provided by degeneratively-doped portions of said semi-insulator body.

6. A field-effect triode device comprising:

(a) a pair of outer electrically conductive layers;

(b) a body of semi-insulator material having a mesa portion of a first conductivity-type disposed between said pair of outer conductive layers;

(c) an inner control electrode member in the form of a grid disposed within and surrounded by said mesa portion of said body;

(d) and a region of semi-insulator material of a conductivity-type different from said first conductivity-type disposed on a surface of said mesa portion of said body and extending thereinto so as to electrically contact said control electrode member.

7. A field-effect triode device comprising:

(a) a pair of outer electrically conductive members;

(b) a body of semi-insulator material having an N-type mesa portion disposed between said pair of outer conductive members;

(c) an inner control electrode member in the form of a grid of P-type semi-insulator material disposed within and surrounded by said N-type mesa portion of said body;

(d) and a region of P-type semi-insulator material disposed on a surface of said N-type mesa portion of said body and extending thereinto so as to electrically contact said control electrode member.

8. A field-effect triode device comprising:

(a) a body of semi-insulator material having a mesa portion of a first conductivity-type and of predetermined resistivity;

(b) a first region of said mesa portion being of said first type of conductivity but of lower resistivity than said predetermined resistivity;

(c) a second region of said body being of said first type of conductivity but of lower resistivity than said predetermined resistivity;

(d) an internal region of said mesa portion of said body being disposed between said first and second regions and in the form of a grid of semi-insulator material of a second type of conductivity opposite to said first type;

(e) and a region of said mesa portion of said body disposed on a surface thereof and having said second type of conductivity and extending into said mesa portion so as to electrically contact said internal region thereof.

References Cited

UNITED STATES PATENTS

| | | | |
|---|---|---|---|
| 3,109,942 | 11/1963 | Luscher | 307—88.5 |
| 2,790,037 | 4/1957 | Shockley | 179—171 |
| 3,176,192 | 3/1965 | Sueur et al. | 317—101 |
| 3,223,904 | 12/1965 | Warner et al. | 317—235 |
| 3,252,003 | 5/1966 | Schmidt | 307—88.5 |

FOREIGN PATENTS

| | | |
|---|---|---|
| 1,324,048 | 3/1963 | France. |

JOHN W. HUCKERT, *Primary Examiner.*

JAMES D. KALLAM, *Examiner.*

R. F. SANDLER, *Assistant Examiner.*